(12) United States Patent
Emeott et al.

(10) Patent No.: US 9,451,452 B2
(45) Date of Patent: Sep. 20, 2016

(54) METHOD OF TRIGGERING A KEY DELIVERY FROM A MESH KEY DISTRIBUTOR

(75) Inventors: Stephen P. Emeott, Rolling Meadows, IL (US); Anthony J. Braskich, Palatine, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 2005 days.

(21) Appl. No.: 12/493,963

(22) Filed: Jun. 29, 2009

(65) Prior Publication Data

US 2010/0329465 A1  Dec. 30, 2010

(51) Int. Cl.
| | | |
|---|---|---|
| *H04L 29/06* | (2006.01) | |
| *H04W 12/04* | (2009.01) | |
| *H04L 9/08* | (2006.01) | |
| *H04L 9/32* | (2006.01) | |
| *H04W 84/18* | (2009.01) | |

(52) U.S. Cl.
CPC ............ *H04W 12/04* (2013.01); *H04L 9/0836* (2013.01); *H04L 9/321* (2013.01); *H04L 63/062* (2013.01); *H04L 63/065* (2013.01); *H04L 2209/80* (2013.01); *H04L 2463/061* (2013.01); *H04W 84/18* (2013.01)

(58) Field of Classification Search
USPC ....................................................... 380/281
See application file for complete search history.

(56) References Cited

U.S. PATENT DOCUMENTS

| | | |
|---|---|---|
| 7,149,478 B2 | 12/2006 | Hawe |
| 7,215,661 B2 | 5/2007 | Backes et al. |
| 7,263,357 B2 | 8/2007 | Lee et al. |
| 7,275,157 B2 | 9/2007 | Winget |
| 7,350,077 B2 | 3/2008 | Meier et al. |
| 7,373,508 B1 | 5/2008 | Meier et al. |
| 7,421,268 B2 | 9/2008 | Lee et al. |
| 7,814,322 B2 * | 10/2010 | Gurevich ................ H04L 45/20 370/252 |
| 2006/0215582 A1 * | 9/2006 | Castagnoli .............. H04L 45/02 370/254 |
| 2006/0265333 A1 * | 11/2006 | Gomes .................... G06F 21/10 705/57 |
| 2007/0250713 A1 * | 10/2007 | Rahman ................ H04L 63/162 713/171 |
| 2008/0063204 A1 * | 3/2008 | Braskich ............... H04L 9/0836 380/270 |

(Continued)

FOREIGN PATENT DOCUMENTS

| | | |
|---|---|---|
| WO | 2007138060 A1 | 12/2007 |
| WO | 2008112455 A2 | 9/2008 |

OTHER PUBLICATIONS

IEEE Standard 802.11i-2004—Part II Wireless LAN Medium Access Control (MAC) and Physical Layer (PHY) specification—Amendment 6: Medium Access Control (MAC) Security Enhancement—Section 8.4.6.1 "Preauthentication and RSNA key management" —pp. 69-70.

(Continued)

*Primary Examiner* — Harris C Wang

(57) ABSTRACT

A mesh station applying for access to a network includes a list of peer stations in messages of an authenticated key establishment protocol. A mesh key distributor derives a key delivery key and generates a top level key, and then delivers the top level key to the mesh station. Following the key establishment protocol, the mesh key distributor also creates pairwise keys for use between the mesh station and the peer stations listed in its peer list. The list of peers permits the identifier for the peer to be bound into the derived key, which helps ensure that the key used between each pair of peers is unique. Once the mesh key distributor finishes creating a key for one of the stations on the peer list, the mesh key distributor sends a message to the peer to initiate a key push.

14 Claims, 4 Drawing Sheets

(56) References Cited

U.S. PATENT DOCUMENTS

| | | | |
|---|---|---|---|
| 2008/0112363 A1* | 5/2008 | Rahman | H04W 8/005 370/331 |
| 2008/0152133 A1* | 6/2008 | Suga | H04L 9/0836 380/45 |
| 2009/0307483 A1 | 12/2009 | Falk et al. | |

OTHER PUBLICATIONS

IEEE Standard 802.11r-2008—Part II Wireless LAN Medium Access Control (MAC) and Physical Layer (PHY) specification—Amendment 2: Fast Basic Service Set (BSS) Transition: Section 8.5.1—"Key Hierarchy"—p. 24-28; Section 11A.5.3—"Over-the-DS FT Protocol Authentication in an RSN"—pp. 59-61; and Section 11A.10—"Remote request broker (RRB) communication"—pp. 86-88.

Draft Standard IEEE P802.11s/D2.06—Jan. 2006—Information Technology—Telecommunications and information exchange between systems—Local and metropolitan area networks—specific requirements—Part II: Wireless LAN Medium Access Control (MAC) and Physical Layer (PHY) specification—Amendment 10: Mesh Networking: Section 8.8—"Key Distribution for MSA"—pp. 80-89.

Draft Standard IEEE P802.11s/D2.06—Jan. 2006—Information Technology—Telecommunications and information exchange between systems—Local and metropolitan area networks—specific requirements—Part II: Wireless LAN Medium Access Control (MAC) and Physical Layer (PHY) specification—Amendment 10: Mesh Networking: Section 11B.5. 1 and 11B.5.2—Mesh link security—pp. 152-164.

Draft Standard IEEE P802.11s/D2.06—Jan. 2006—Information Technology—Telecommunications and information exchange between systems—Local and metropolitan area networks—specific requirements—Part II: Wireless LAN Medium Access Control (MAC) and Physical Layer (PHY) specification—Amendment 10: Mesh Networking: Section 1B.5.5, 11B.5.6, 11B.5.7—Mesh link security—pp. 178-193.

International Search Report & Written Opinion for International Application No. PCT/US2010/037857 mailed on Feb. 1, 2011.

Anne Marie Hegland et al., "A Survey of Key Management in Ad Hoc Networks," IEEE Communications Surveys, IEEE, NY, US, vol. 8, No. 3, Jul. 1, 2006, pp. 48-66.

Menezes A J et al., "Chapter 13: Key Management Techniques," Handbook of Applied Cryptography; CRC Press, Boca Raton, FL, US, Oct. 1, 1996, pp. 543-590, http://www.cacr.math.uwaterloo.ca/hac/.

Menezes A J et al.,"Chapter 12: Key Establishment Protocols," Handbook of Applied Cryptography, CRC Press, Boca Raton, FL, US, Oct. 1, 1996, pp. 489-541,:http://www.cacr.math.uwaterloo.ca/hac/.

International Preliminary Report on Patentability for International Application No. PCT/US2010/037857 dated Jan. 4, 2012.

* cited by examiner

METHOD OF TRIGGERING A KEY DELIVERY FROM A MESH KEY DISTRIBUTOR

FIELD OF THE DISCLOSURE

The present disclosure relates generally to wireless communications and more particularly to security in a multi-hop ad hoc network.

BACKGROUND

Infrastructure-based wireless networks, such as cellular networks or satellite networks, typically include a communications network with fixed and wired gateways. Many infrastructure-based wireless networks employ a mobile unit or host which communicates with a fixed base station that is coupled to a wired network. The mobile unit can move geographically while it is communicating over a wireless link to the base station. When the mobile unit moves out of range of one base station, it may connect or "handover" to a new base station and starts communicating with the wired network through the new base station.

In comparison to infrastructure-based wireless networks, ad hoc networks are self-forming wireless networks which can operate in the absence of any fixed infrastructure, and in some cases an ad hoc network is formed entirely of mobile units. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network.

A mesh network is a form of an ad hoc wireless network based on autonomous collections of mobile nodes that communicate with each other over wireless links having limited bandwidths. Individual nodes in a mesh network can perform routing functions, which enable a mesh network to be reconfigured around blocked paths or poor connections by "hopping" from one node to another until a destination is reached. A mesh network is thus described as self-healing, as it can still operate effectively even when particular nodes break down or leave the network.

As wireless communications networks such as mesh networks become more prevalent, security continues to be a major concern to both communications network providers and end users. In a wireless communications mesh network the security environment can offer the greatest challenges since data may be readily received and manipulated by many nodes. The radio links used in a wireless communications mesh network expose signaling and other data traversing the network to eavesdroppers and/or would-be hackers. In a multi-hop wireless communications mesh network, this requires each link between the meshed devices to have a unique security association established through a multi-hop authentication and key management process. Frames sent over-the-air on the link then can be protected with established security associations.

Mesh networks that use centralized authentication to limit access to authorized mesh stations may utilize a key distributor to manage and distribute keys and to facilitate accelerated secure peer link establishment and network formation. For example, in a mesh network employing a key distributor, mesh stations may contact the key distributor in order to gain entry into the mesh and later to gain access to keys needed to authenticate peers. As a key holder for the mesh station, a mesh key distributor may need to create keys associated with the station to be delivered one or more peer mesh stations. Key generation can be demanding in terms of the number of computing cycles required to execute a key derivation and/or random number algorithm. Additionally, key distribution can be demanding in terms of the round trip times between the mesh key distributor and the peer mesh stations.

In order to optimize performance and accelerate secure peer link establishment, an unresolved problem is how to push derived keys from the mesh key distributor to mesh peers at the earliest possible moment after a mesh station gains entry into the mesh. Accordingly, there is a need for a method of triggering a key push from a mesh key distribution center.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
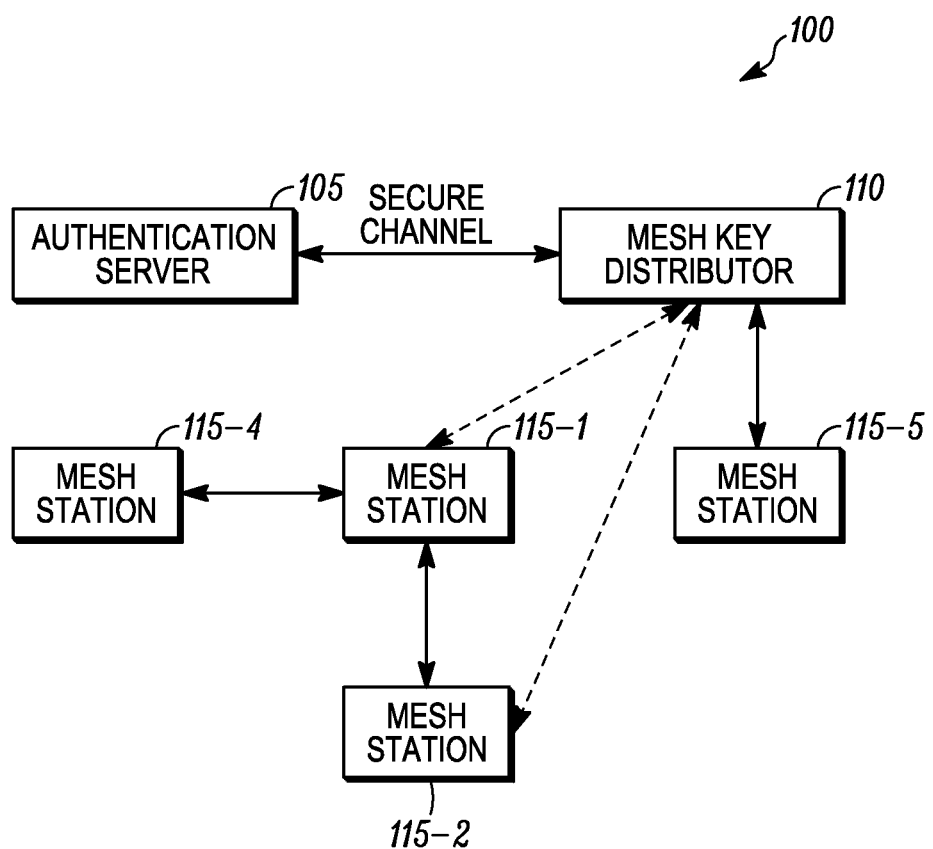
FIG. 1 illustrates an ad hoc wireless network for implementation of some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to various embodiments a mesh station applying for access to a network includes a list of peer stations in messages of an authenticated key establishment protocol. For example, the list of peer stations may be included in any or all of the messages transmitted by a mesh station to the mesh key distributor during a key agreement protocol. During the key agreement protocol, the mesh key distributor derives a top level key based upon its contributions and the contributions of the mesh station. Alternatively the mesh key distributor derives a key delivery key and generates a top level key, and then delivers the top level key to the mesh station during a key transfer protocol. In either case, following the key establishment protocol, the mesh key distributor also creates pairwise keys for use between the mesh station and the stations listed in its peer list. The list of peers permits the identifier for the peer to be bound into the derived key, which helps ensure that the key used between each pair of peers is unique. Once the mesh key distributor finishes creating a key for one of the stations on the peer list, the mesh key distributor may send a message to the peer to initiate a key push.

FIG. 1 illustrates an ad hoc wireless network 100 for implementation of some embodiments. The ad hoc wireless network 100, for example, can be a mesh enabled architecture (MEA) network or an 802.11 network (i.e. 802.11a, 802.11b, 802.11g, or 802.11s). (For these and any Institute of Electrical and Electronics Engineers (IEEE) standards recited herein, see: http://standards.ieee.org/getieee802/index.html or contact the IEEE at IEEE, 445 Hoes Lane, PO Box 1331, Piscataway, N.J. 08855-1331, USA.) It will be appreciated by those of ordinary skill in the art that the communication network 100 in accordance with the present invention can alternatively comprise any packetized communication network where packets are forwarded across multiple wireless hops. For example, the ad hoc wireless network 100 can be a network utilizing packet data protocols such as OFDMA (orthogonal frequency division multiple access), TDMA (time division multiple access), GPRS (General Packet Radio Service) and EGPRS (Enhanced GPRS). Additionally, each wireless hop of the packetized communication network 100 may either employ the same packet data protocol as the other hops, or a unique packet data protocol per hop.

As illustrated in FIG. 1, the ad hoc wireless network 100 includes an authentication server (AS) 105. The authentication server 105 works to provide authentication services to the various nodes within the ad hoc wireless network 100, and will be described hereinafter. In general, the authentication server 105 performs the authentication function necessary to check the credentials of a supplicant on behalf of the authenticator and indicates whether the supplicant is authorized to access the network's services. In one embodiment of the present invention, the authentication server 105 is located in the wired network section where physical security of the host can be provided. For example, the authentication server 105 can be an extensible authentication protocol-Tunneled Transport Layer Security/extensible authentication protocol-transport layer protocol (EAP-TTLS/EAP-TLS) enabled remote authentications dial-in user service (RADIUS) server for the centralized authentication.

Communicatively coupled to the authentication server 105 is a mesh key distributor (MKD) 110. For example, the MKD 110 can be communicatively coupled to the AS 105 by a secure wired channel. The mesh key distributor 110 derives and distributes keys to one or more mesh stations 115-$n$. The mesh key distributor 110 further can provide authentication, authorization, and accounting, and exchanges security messages with the authorization server 105. In operation of some embodiments of the present invention, the mesh key distributor 110, manages the mesh key hierarchy by performing key derivation and secure key distribution. A mesh security domain is defined by the presence of a single MKD 110. The MKD 110 derives keys to create a mesh key hierarchy, and distributes derived keys to the mesh stations 115-$n$.

The ad hoc wireless network 100 includes a plurality of mesh stations 115-$n$, also called mesh nodes, which can communicate with each other and with the MKD 110 using wireless links such as links conforming to Institute of Electrical and Electronics Engineers (IEEE) 802.11 standards. Each Mesh Station (MS) 115 can comprise, for example, a mobile telephone, a two-way radio, a notebook computer or other wireless communication device. As can be appreciated by one skilled in the art, the mesh stations 115 are capable of communicating with each other directly or indirectly. When communicating indirectly, one or more other mesh stations 115 can operate as a router or routers for forwarding or relaying packets being sent between mesh stations and/or other nodes in the ad hoc wireless network 100.

It will be appreciated that for illustration purposes, the mesh stations 115 are shown generically, and further that the one or more of the mesh stations 115-$n$ may be a mesh authenticator (MA) (not illustrated) during an authentication exchange. When serving as a MA, the one or more mesh stations may forward authentication messages to and from other mesh stations as these other mesh stations authenticate with the authentication server through the mesh key distributor. Additionally, one or more of the mesh stations 115-$n$ may be a mesh supplicant (not illustrated) operating through a mesh authenticator during an authentication exchange with a mesh key distributor and authentication server. After the conclusion of a successful authentication exchange between the mesh supplicant, the mesh key distributor, and the authentication server, and after a key delivery key has been established between the mesh supplicant, the one or more mesh stations may take the role of a mesh authenticator during subsequent authentication exchanges with one or more of the mesh stations 115-$n$.

Figure 2:
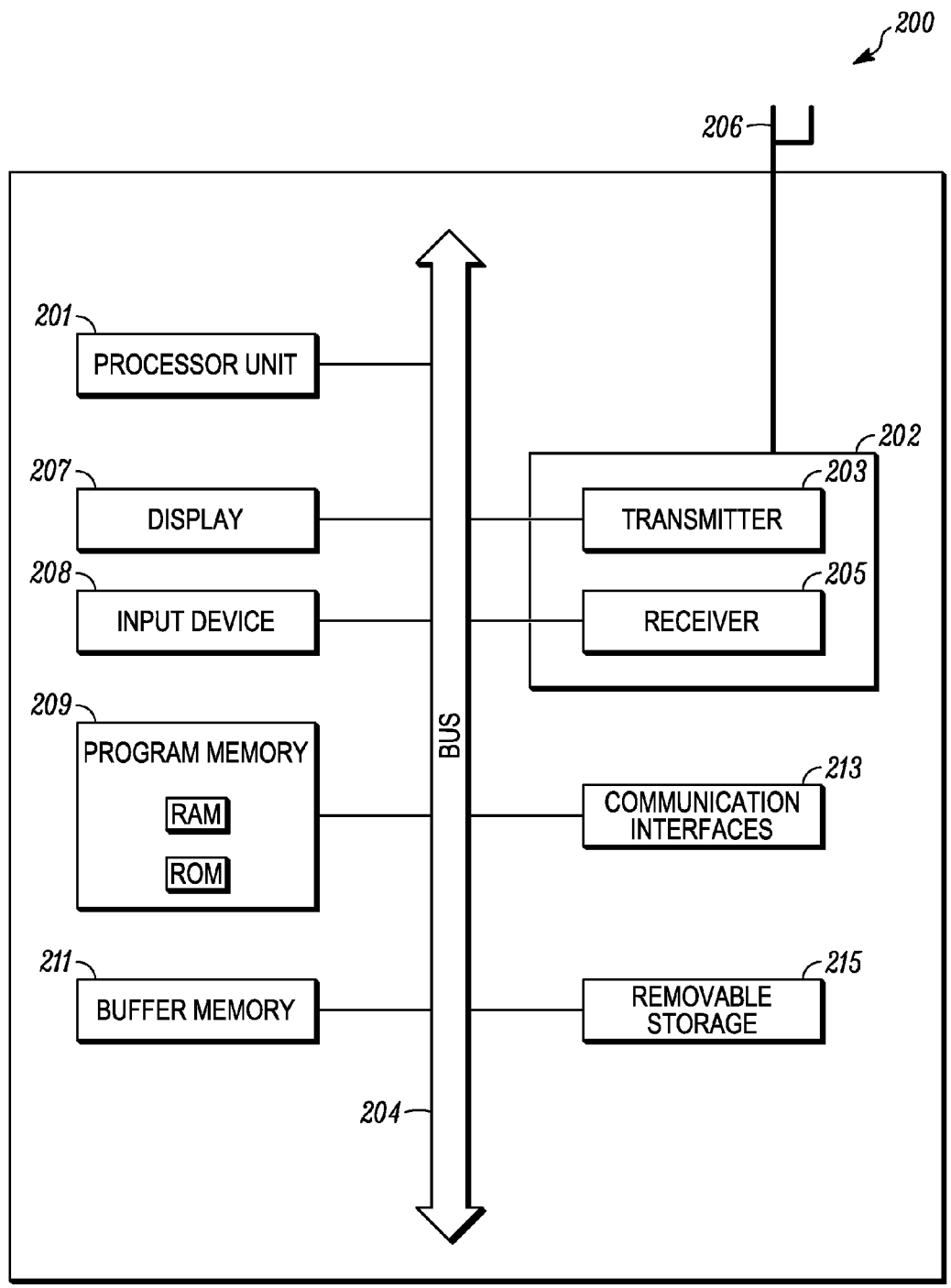
FIG. 2 is a block diagram of a node for operation within the ad hoc wireless network of FIG. 1.

FIG. 2 is a block diagram of a node 200 for operation within a wireless communication network. The node 200, for example, can be a mesh station 115 or a mesh key distributor 110 of the ad hoc wireless network 100 of FIG. 1. The node 200 comprises a processor 201, a transceiver 202 including a transmitter circuitry 203 and a receiver circuitry 205, an antenna 206, a display 207, an input device 208, a program memory 209 for storing operating instructions that are executed by the processor 201, a buffer memory 211, one or more communication interfaces 213, and a removable storage unit 215. Although not shown, the node 200 also preferably includes an antenna switch, duplexer, circulator, or other highly isolative means (not shown) for intermittently providing information packets from the transmitter circuitry 203 to the antenna 206 and from the antenna 206 to the receiver circuitry 205. The node 200 is preferably an integrated unit containing at least all the elements depicted in FIG. 2, as well as any other elements necessary for the node 200 to perform its particular functions. Alternatively, the node 200 may comprise a collection of appropriately interconnected units or devices, wherein such units or devices perform functions that are equivalent to the functions performed by the elements of the node 200. For example, the node 200 may comprise a laptop computer and a wireless LAN (local area network) card.

The processor 201 preferably includes one or more microprocessors, microcontrollers, DSPs (digital signal processors), state machines, logic circuitry, or any other device or devices that process information based on operational or programming instructions. Such operational or programming instructions are preferably stored in the program memory 209. The program memory 209 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 201 has one or more of its functions performed by a state machine or logic circuitry, the memory 209 containing the corresponding operational instructions may be embedded within the state machine or logic circuitry.

The operations performed by the processor 201 and the rest of the node 200 are described in detail below.

The transmitter circuitry 203 and the receiver circuitry 205 enable the node 200 to communicate information packets to and acquire information packets from the other nodes. In this regard, the transmitter circuitry 203 and the receiver circuitry 205 include conventional circuitry to enable digital or analog transmissions over a wireless communication channel. The transmitter circuitry 203 and the receiver circuitry 205 are designed to operate over both a cellular air interface (e.g., Global System for Mobile communication (GSM), Code Division Multiple Access (CDMA), Wideband CDMA (WCDMA), Universal Mobile Telecommunications System (UMTS), and the like) and an ad hoc networking air interface (e.g., BLUETOOTH, 802.11 WLAN (wireless local area network), 802.16 WiMax, and the like)

The implementations of the transmitter circuitry 203 and the receiver circuitry 205 depend on the implementation of the node 200. For example, the transmitter circuitry 203 and the receiver circuitry 205 can be implemented as an appropriate wireless modem, or as conventional transmitting and receiving components of two-way wireless communication devices. In the event that the transmitter circuitry 203 and the receiver circuitry 205 are implemented as a wireless modem, the modem can be internal to the node 200 or insertable into the node 200 (e.g., embodied in a wireless radio frequency (RF) modem implemented on a Personal Computer Memory Card International Association (PCM-CIA) card). For a wireless communication device, the transmitter circuitry 203 and the receiver circuitry 205 are preferably implemented as part of the wireless device hardware and software architecture in accordance with known techniques. Most, if not all, of the functions of the transmitter circuitry 203 and/or the receiver circuitry 205 may be implemented in a processor, such as the processor 201. However, the processor 201, the transmitter circuitry 203, and the receiver circuitry 205 have been artificially partitioned herein to facilitate a better understanding.

The receiver circuitry 205 is designed to allow receiving of RF signals from within at least one bandwidth and optionally more bandwidths, if the communications with the proximate device are in a frequency band other than that of the network communications. The receiver circuitry 205 may optionally comprise a first receiver and a second receiver, or one receiver designed to allow receiving within two or more bandwidths. The transceiver 202 includes at least one set of transmitter circuitry 203. The at least one transmitter 203 may be designed to allow transmitting to multiple devices on multiple frequency bands. As with the receiver 205, dual transmitters 203 may optionally be employed where one transmitter is for the transmission to a proximate node or direct link establishment to wireless local area networks (WLANs) and the other transmitter is for transmission to a cellular base station.

The antenna 206 comprises any known or developed structure for radiating and receiving electromagnetic energy in the frequency range containing the wireless carrier frequencies.

The buffer memory 211 may be any form of volatile memory, such as RAM, and is used for temporarily storing received information packets in accordance with the present invention.

Figure 3:
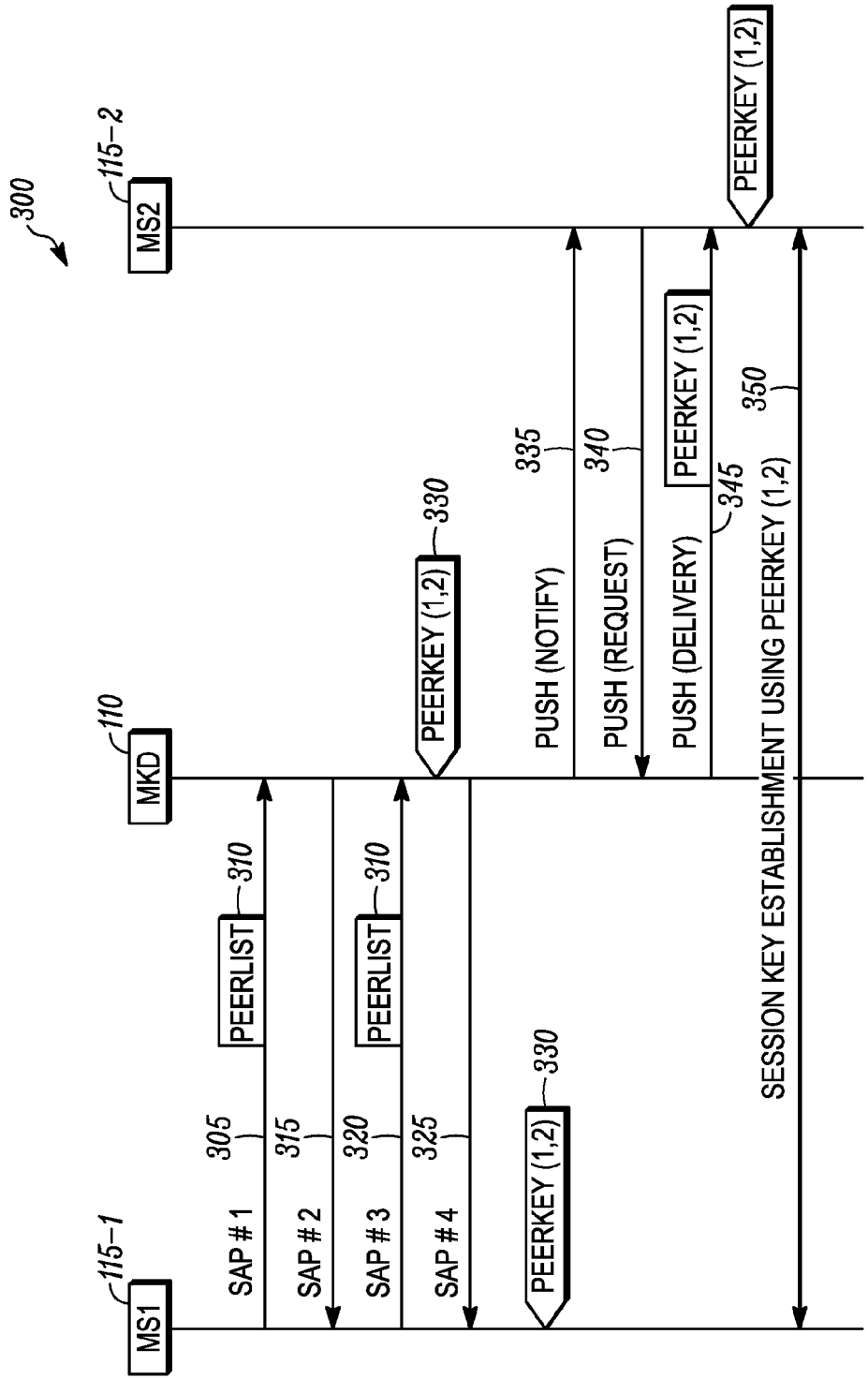
FIG. 3 and FIG. 4 are message sequence charts illustrating interactions between elements of the ad hoc wireless network to provide secure key transport, according to some embodiments.

Referring to FIG. 3, a message sequence chart 300 illustrates interactions between elements of the ad hoc wireless network 100 to provide secure key transport, according to some embodiments.

As illustrated, a mesh station 115-1 exchanges a security association protocol (SAP) with a mesh key distributor 110 at line 305. In SAP messages sent from MS1 115-1 to the MKD 110, a peer list 310 is included, which identifies one or more peers of the MS1 115-1. For example, referring to FIG. 1, the peer list 310 can include identification of Mesh Stations 115-2 and 115-4. As illustrated in FIG. 3, the security association protocol messages can include a handshake of request, response, confirmation and acknowledgement as in lines 305, 315, 320, and 325.

In some embodiments, the MKD 110 and the MS1 115-1 share a master key before the SAP starts (not illustrated), wherein the master key can be obtained through an authentication exchange between the mesh station, a mesh key distributor and an authentication server. SAP #1 305 is a message sent from the MS1 115-1 to the MKD 110, requesting establishment of a key distributor security association. SAP #1 305 contains identifiers of both the MKD 110 and the MS1 115-1, a pseudo-random value generated by the MS1 115-1, called a nonce, a peer list 310, and a message integrity check (MIC) computed using the master key. As is well known in the art, the MIC is a calculated value that may accompany data to provide assurance about its integrity. The inputs to a MIC calculation include data to be protected, and a secret key. The MIC provides data origin authenticity and message integrity to a recipient. Data origin authenticity assures the recipient that the sender was someone possessing the secret key. Moreover, as only two parties know the secret key, data origin authenticity provides the recipient assurance of the identity of the sender. Message integrity assures the recipient that the protected data were not modified during transmission. As used in this specification, a MIC is analogous to a "message authentication code" as is known in the field of cryptography. Those skilled in the art will appreciate that operations of a MIC, according to some embodiments of the present invention, could also be performed using various other types of data origin information that can provide data origin authenticity and message integrity.

SAP #2 315 is a response message sent from the MKD 110 to the MS1 115-1. SAP #2 315 contains identifiers of both the MKD 110 and the MS1 115-1, a nonce generated by the MKD 110, and a MIC computed using the master key. SAP #3 320 is a confirmation message sent from MS1 115-1 to the MKD 110, and contains identifiers of both MKD 110 and MS1 115-1, the nonce generated by the MS1 115-1, the nonce generated by the MKD 110, the peer list 310, and a MIC computed using the master key. SAP #4 325 is an acknowledgement message sent from MKD 110 to the MS1 115-1, and contains identifiers of both MKD 110 and MS1 115-1, nonces generated by both MKD 110 and MS1 115-1, and a MIC computed using the master key.

PeerKey (1, 2) 330 is a peer key derived at the MKD 110 and at the MS1 115-1 during or after SAP. PeerKey (1, 2) 330 is a key designed for use between the MS1 115-1 and the MS2 115-2.

Following SAP, the MKD 110 initiates a key push protocol to MS2 115-2, which was identified in PeerList 310. The 3-message key push protocol including a push notify 335 from the MKD 110 to the MS2 115-2, a push request 340 from the MS2 115-2 to the MKD 110 and a push delivery 345 from the MKD 110 to the MS2 115-2 is illustrated for reference. A push notify 335 provides notification to the MS2 115-2 that a key is available at the MKD 110 and identifies the key. The push request 340 requests the MKD 110 to deliver the key that was identified in the push notify 335. The push delivery 345 delivers an encrypted, or wrapped, key from the MKD 110 to the MS2 115-2. At the conclusion of the key push protocol, the MS2 115-2 possesses PeerKey (1, 2) 330. Because MS1 115-1 and MS2 115-2 share PeerKey (1, 2) 330 soon after SAP completes, they can execute a session key establishment protocol 350 to secure their peer link without delay.

Although not shown in FIG. 3, the MKD 110 can initiate key push protocols with several mesh stations 115-*n* as a result of receiving the peer list 310. For example, referring to FIG. 1, the peer list 310 can include identification of the MS 115-4, in addition to the MS2 115-2. Thus, the MKD 110 can initiate a key push protocol with the MS 115-4 before, during, or after completing the mesh key push protocol with the MS2 115-2. The PeerKey delivered to the MS 115-4, for example, is different than the PeerKey delivered to the MS2 115-2.

Figure 4:
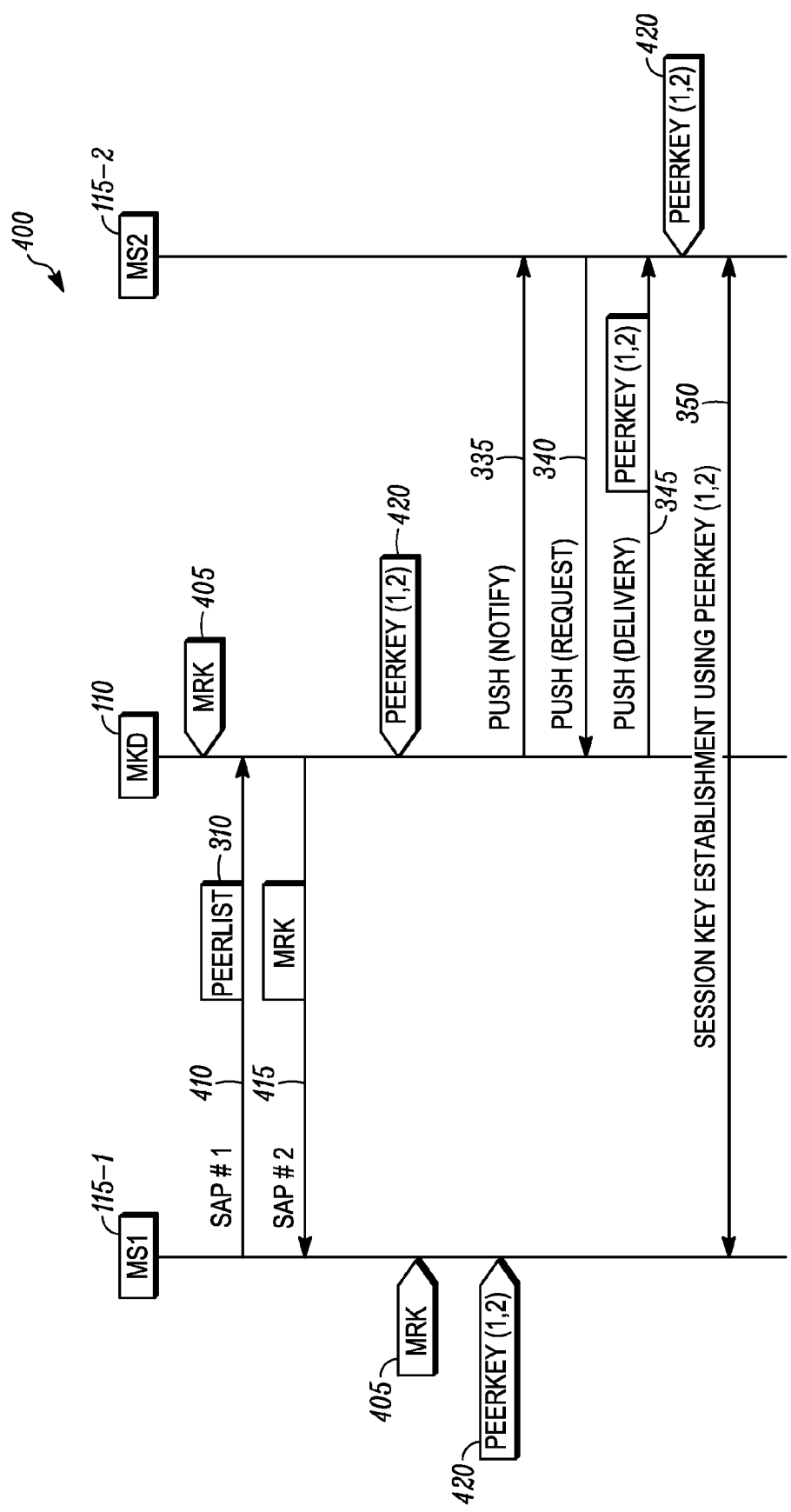

Referring to FIG. 4, a message sequence chart 400 illustrates interactions between elements of the ad hoc wireless network 100 to provide secure key transport, according to some embodiments.

In embodiment of FIG. 4, the mesh key distributor derives a key delivery key and generates a top level key, and then delivers the top level key to the mesh station. As illustrated, an MKD 110 generates a mesh root key (MRK) 405, which is a top level key. Subsequently, a mesh station 115-1 runs a security association protocol (SAP) with the mesh key distributor 110, starting at line 410. SAP #1 410 is a message sent from the MS1 115-1 to the MKD 110, requesting establishment of a security association and requesting delivery of a MRK. SAP #1 410 contains identifiers of both the MKD 110 and the MS1 115-1, a nonce generated by the MS1 115-1, a peer list 310, and a MIC computed using the master key. In SAP message #1 410 sent from MS1 115-1 to the MKD 110, a peer list 310 is included, which identifies one or more peers of the MS1 115-1. For example, referring to FIG. 1, the peer list 310 can include identification of Mesh Stations 115-2 and 115-4. In some embodiments, the MKD 110 and the MS1 115-1 share a master key before the SAP starts.

SAP #2 415 is a response messages sent from the MKD 110 to the MS1 115-1. SAP #2 415 contains identifiers of both the MKD 110 and the MS1 115-1, the MRK 405, which is encrypted (or, wrapped) using the master key, a nonce generated by the MKD 110 and a MIC computed using the master key. Upon reception of the SAP #2 415, the MS1 115-1 possesses the MRK 405.

PeerKey (1, 2) 420 is a peer key derived from the MRK 405 at both the MKD 110 and the MS1 115-1. PeerKey (1, 2) 420 is a key designed for use between the MS1 115-1 and the MS2 115-2.

Following SAP, the MKD 110 initiates a key push protocol to MS2 115-2, which was identified in PeerList 310. The 3-message key push protocol including a push notify 335 from the MKD 110 to the MS2 115-2, a push request 340 from MS2 115-2 to MKD 110 and a push delivery 345 from MKD 110 to MS2 115-2 is illustrated for reference. The push delivery 345 delivers an encrypted, or wrapped, PeerKey(1,2) 420 from the MKD 110 to the MS2 115-2. At the conclusion of the key push protocol, the MS2 115-2 possesses PeerKey (1, 2) 420. Because MS1 115-1 and MS2 115-2 share PeerKey (1, 2) 420 after SAP completes, they can execute a session key establishment protocol 350 to secure their peer link without delay.

As described herein, the present invention provides a method for proactively distributing encryption keys to potential peers of the mesh station within the mesh network. A mesh network implemented in accordance with the present invention permits a mesh station to submit requests to a mesh key distributor, wherein these requests instruct the mesh key distributor to generate and forward security keys to one or all potential neighbors having security associations with the mesh key distributor.

In this manner, neighboring peers have already been provided with an encryption key before the mesh station connects to any one of them. It makes possible maintaining uninterrupted communication when the mesh station is moving and it accelerates the establishment of a network of secure mesh links within a neighborhood of peers. If a mobile station is moving, such as at walking or highway speed, the present invention can facilitate soft transitions between neighbors and neighborhoods as a mesh station moves relative to its neighbors.

An alternate embodiment of the present invention can include a mesh authenticator which submits the request for encryption keys on behalf of the supplicant mesh station for each neighboring station (it can discover the neighboring stations or may be configured with such list).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of triggering a transmission of a key from a mesh key distributor, the method comprising:
    transmitting, by a mesh station, at least one security message to the mesh key distributor, wherein the at least one security message includes a list of peer station identifiers;
    deriving, by the mesh key distributor, a peer key for use between a peer station identified in the list of peer station identifiers and the mesh station; and
    transmitting, by the mesh key distributor, a key push message to the peer station to initiate a key push to the peer station for the derived peer key.

2. The method as claimed in claim 1, wherein the at least one security message comprises a security association message.

3. The method as claimed in claim 2, wherein the at least one security association message comprises at least one message of a key agreement protocol.

4. The method as claimed in claim 1, further comprising prior to the transmitting of the security message:
    sharing a master key between the mesh station and the mesh key distributor.

5. The method as claimed in claim 1, wherein the derived peer key is a unique key between the peer and the mesh station.

6. The method as claimed in claim 5, further comprising:
    deriving, by the mesh key distributor, a plurality of unique peer keys, each peer key associated with one peer identified in the list of peer station identifiers.

7. The method as claimed in claim 6, further comprising:
    transmitting, by the mesh key distributor, a key push message to each of the peer stations to initiate a key push for each of the derived peer keys.

8. The method as claimed in claim 1, further comprising:
    executing a session key establishment protocol between the mesh station and the peer station to secure a peer link.

9. The method as claimed in claim 1, further comprising prior to the transmitting of the at least one security message:
    generating, by the mesh key distributor, a top level key.

10. The method as claimed in claim 9, wherein the mesh key distributor generates the top level key based upon one or more contributions of the mesh key distributor and one or more contributions of the mesh station.

11. The method as claimed in claim 9, wherein the top level key comprises a mesh root key.

12. The method as claimed in claim 9, further comprising:
    transmitting, by the mesh key distributor, the top level key to the mesh station.

13. The method as claimed in claim 12, wherein the peer key is derived by the mesh key distributor using the top level key, the method further comprising:
    deriving, by the mesh station, the peer key using the top level key.

14. A method of triggering a transmission of a key from a mesh key distributor, the method comprising:
    generating, by the mesh key distributor, a top level key based upon one or more contributions of the mesh key distributor and one or more contributions of a mesh station;
    transmitting, by the mesh station, at least one security message to the mesh key distributor, wherein the at least one security message includes a list of peer station identifiers;
    transmitting, by the mesh key distributor, the top level key to the mesh station in response to receiving the at least one security message;
    deriving, by each of the mesh key distributor and the mesh station, using the top level key, a peer key for use between a peer station identified in the list of peer station identifiers and the mesh station;
    transmitting, by the mesh key distributor, a key push message to the peer station to initiate a key push to the peer station for the derived peer key; and
    executing a session key establishment protocol between the mesh station and the peer station using the peer key to secure a peer link.

* * * * *